Feb. 1, 1927.
W. E. HART
1,616,045
VACUUM TANK
Filed July 2, 1926
2 Sheets-Sheet 1
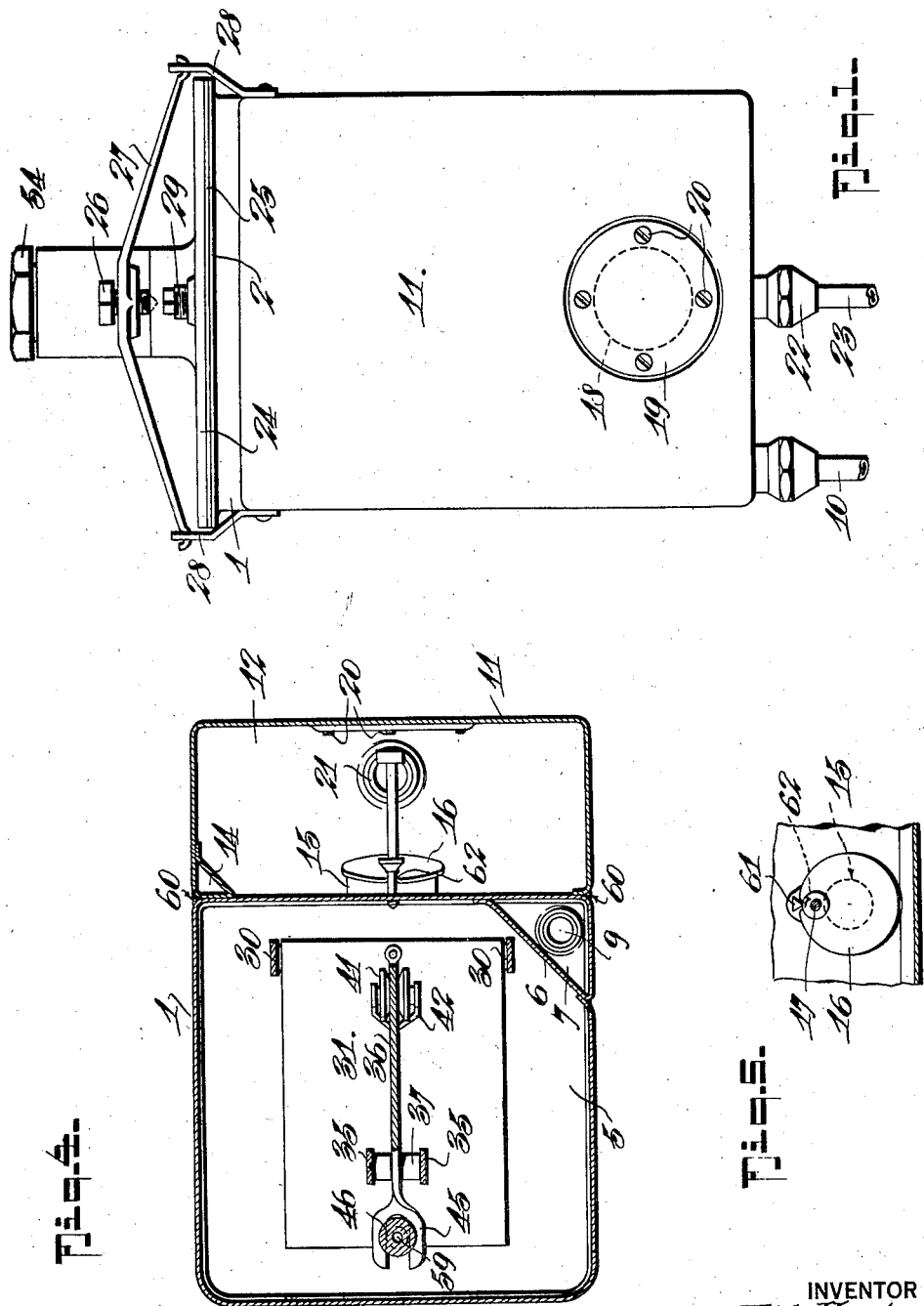
INVENTOR
*W. E. Hart.*
BY
*Albert E Dietrich*
ATTORNEY Feb. 1, 1927.                      1,616,045
W. E. HART
VACUUM TANK
Filed July 2, 1926        2 Sheets-Sheet 2
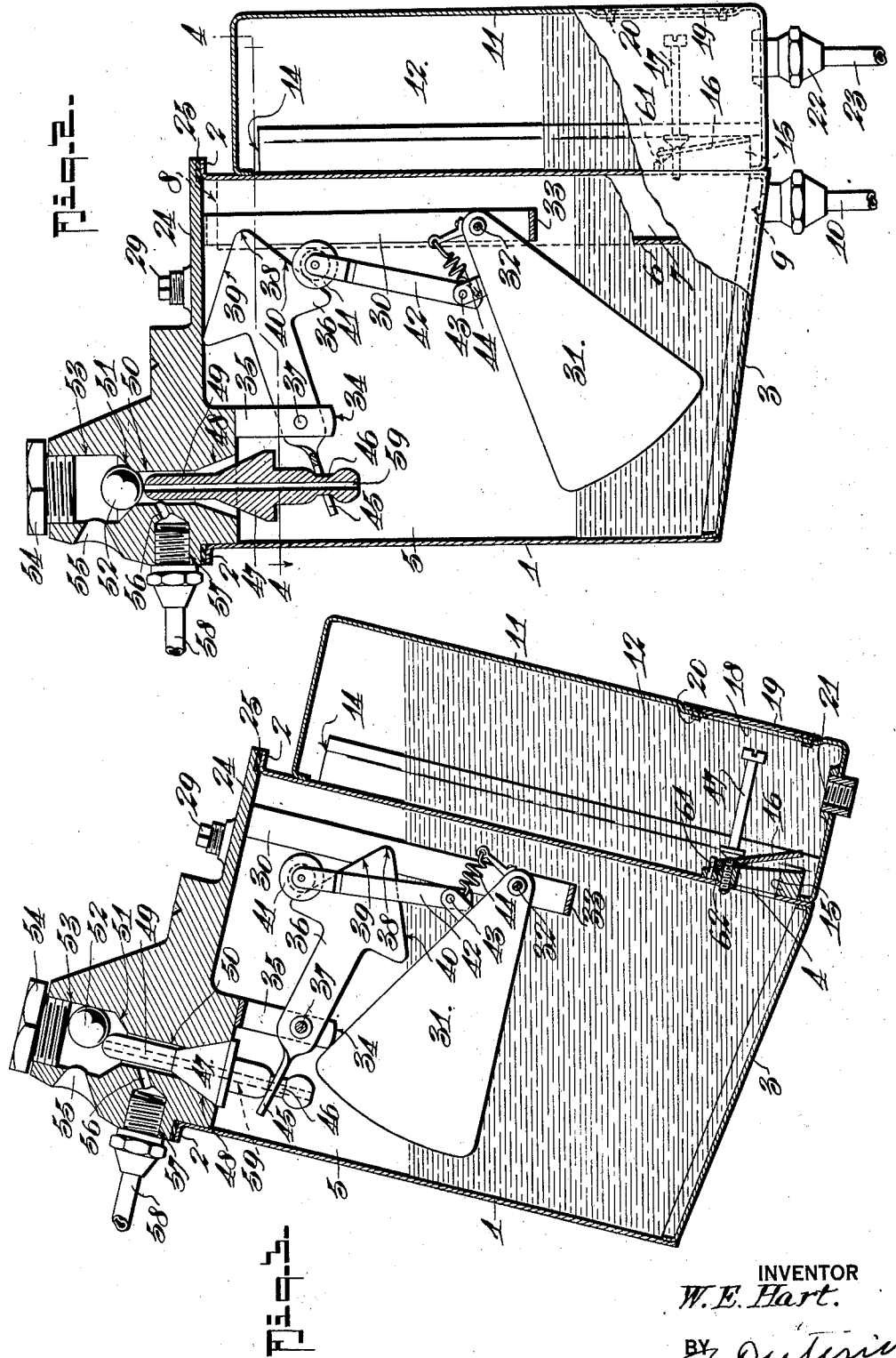
INVENTOR
W. E. Hart.
BY
ATTORNEY Patented Feb. 1, 1927.

1,616,045

UNITED STATES PATENT OFFICE.

WILLIAM E. HART, OF SAN JOSE, CALIFORNIA.

VACUUM TANK.

Application filed July 2, 1926. Serial No. 120,167.

The invention primarily has for its object to provide an improved structure in vacuum tanks adapted for lifting liquid fuel from a low level supply tank to an elevated receptacle from which it is permitted to flow by gravity to the point of use, such as the carbureter of an automobile engine.

In its more detailed nature the invention seeks to provide a tank of the class described wherein the receiving and discharging chambers are placed side-by-side, thus providing a more shallow structure and permitting the positioning of the same at a greater elevation assuring perfect gravity feed under all conditions.

A further object of the invention resides in the arrangement of the tank chambers in a manner whereby a higher fuel level is commonly maintained in the discharge chamber than is maintained in the receiving chamber, due to the effect of quick starting and the momentum of the automobile on which it is mounted, or the inclined relation occasioned by travel up steep grades, assuring perfect outflow of fuel under otherwise unfavorable conditions occasioned by car position or travel.

The invention further resides in the novel details of construction, combination and arrangement of parts, all of which will be first fully described in the following detailed description, then be particularly pointed out in the appended claims, reference being had to the accompanying drawings, in which:

Figure 1 is a rear elevation of my improved vacuum tank.

Figure 2 is a vertical section of the tank illustrating the parts as positioned for causing induction of fuel into the receiving chamber from the supply tank.

Figure 3 is a similar view illustrating the action of the tank when the automobile on which it is mounted is traveling up an incline.

Figure 4 is a horizontal section taken on the line 4—4 on Figure 2.

Figure 5 is a detail view of the flap valve, the mounting screw being shown in section.

In the drawings, 1 indicates the main tank body which is preferably square in horizontal section and having its open top surrounded by an outwardly extending flange 2 and its closed bottom inclined downwardly at 3 toward the fuel passage opening 4 provided at the lower end of the rear wall thereof. The main tank 1 encloses what is hereinafter termed the fuel receiving chamber 5.

One corner of the tank body 1 is partitioned off as at 6 to provide a vertically disposed fuel induction chamber 7 which terminates short of the top of the tank as at 8 to provide a discharge opening and communicates as at 9 at its lower end with the fuel supply line 10 leading from a suitable source of fuel supply. This fuel supply will probably be the low positioned gasoline tank of an automobile upon which the device is mounted.

A supplementary tank body 11 is secured to the rear wall of the main tank body 1 so that the fuel discharge chamber 12 encased thereby will be positioned on substantially the same level as the fuel induction chamber 7 and to the rear of that chamber (considering the direction of travel of the automobile on which the device is mounted) for a purpose hereinafter described. The tank body 11 is also preferably of rectangular horizontal cross section and has one corner thereof partitioned off as at 6 to provide a vertically disposed air passageway 14 which communicates adjacent the top of the tank body 11 with the interior of that body and at its lower end to atmosphere.

The tank body 11 is provided with a valve seat 15 having a fuel induction passageway therethrough adapted to register with the passage 4 of the main tank body hereinbefore referred to and a back check flap valve 16 is secured as at 17 in cooperative relation with the said seat so that fuel will be permitted to pass from the chamber 5 of the main tank into the chamber 12 of the supplementary tank but not in the reverse direction. An opening 18 is provided in the rear wall of the supplementary tank body 11 through which free access may be had to the valve 16 and its mounting and the said opening is closed by a cover plate 19 secured to position by the screws 20.

A fuel outlet 21 is provided in the bottom of the tank body 11 and is connected as at 22 with a suitable fuel distributing line 23 adapted to distribute the fuel to the point of use as, for example, the carbureter of the automobile upon which the device is mounted.

The open top of the main tank body 1 is closed by a cover plate 24 which seats against the gasket 25 and is secured to position by the securing or clamping screw 26 which passes through the cross clamp bar 27 having its ends passed through slots in the securing lugs 28 secured to the tank body 1, as shown. As will hereinafter appear, the cover plate 24 carries all of the operating parts of my improved tank and the said plate is provided with a suitable screw plug 29 through which a quantity of fuel may be administered at any time necessary to "prime" the tank.

A pair of hanger brackets 30 are secured to and project downwardly from the cover plate 24 and a triangular float 31 is pivoted to the lower ends of said bracket as at 32, the said brackets being connected by a cross bar 33 providing a lower limiting stop for limiting downward movement of the float in the manner indicated in Figure 2 of the drawings.

Upper limiting stops 34 are provided by the lower ends of the arms 35 also depending from the cover plate 24 and which limit upward movement of the float 31.

The valve actuating lever 36 is pivoted at 37 between the arms 35 and the said lever is equipped at its long end with an arrow head having a central point 38, an upper cam edge 39 and a lower cam edge 40.

A roller 41 carried by the upper end of the arm 42 pivoted at 43 to the float is held in constant contact with the arrow head end of the lever by the spring 44 connected to the lower end of the said lever and to the float in the manner indicated. Thus, the roller 41 is always held in contact either with the upper cam edge 39 to force the arrow head equipped end of the lever downwardly or with the lower cam edge 40 to force the said lever end in the reverse direction in the manner illustrated in Figures 3 and 2, respectively.

The free end of the lever 36 opposite the arrow head equipped end is bifurcated at 45 to straddle the lower extended end 46 of the cone valve body 47 which operates in a seat 48 formed in the cover plate 24. The valve member 47 includes a vertical stem extension 49 adapted to operate in a slightly larger passage 50 provided in a vertically extended enlargement of the cap 24 and which merges at its upper end with the ball valve seat 51.

A ball valve 52 is adapted to cooperate with the seat 51 and is freely movable in the enlarged chamber 53 provided therefore above the valve seat and which is closed by the removable screw plug 54, the chamber 53 being open to atmosphere as at 55.

A suction duct 56 leads into the passage 50 from the tap 57 into which the suction line 58 is secured, which said suction line leads from any suitable source of suction line as the intake manifold of the engine of the automobile on which the device is mounted.

So that fuel will be delivered to the carbureter of the engine when most needed, that is, in climbing steep grades or in similar unfavorable conditions, a side-by-side arrangement of my main and supplementary tanks, and the particularly constructed mechanism which I have provided, is employed.

By providing the downwardly inclined bottom 3 for the main tank the fuel therein will be more readily directed toward the discharge opening 4 and by positioning the supplementary tank body 11 on the same level and to the rear of the main tank body each time the automobile suddenly picks up momentum or drives up a steep incline fuel from the main or receiving chamber 5 will be caused to flow into the supplementary or discharge chamber 12 in the manner illustrated in Figure 3 of the drawings so that when normal conditions of travel again prevail a considerable overbalance of fuel will be present in the chamber 12, as illustrated in Figure 2 of the drawings, thus tending always to provide a higher lever of fuel in the said discharging chamber 12.

In operation, assume the parts to be in the position illustrated in Figure 3 of the drawings, we have the main and supplementary chambers 5 and 12 well filled with fuel and the valve member 47 held upwardly by contact of the spring held roller 41 against the upper cam edge 39 in the manner illustrated. This causes a tight seating of the valve, closing off suction communication between the suction line 57 and the chamber 5. This position of the valve member serves to unseat the ball valve 52 as illustrated. Air is thus admitted into the chamber 5 through the air passage 59 extending vertically through the valve member 46, 47, 49 to assure proper flow of the fuel from the said chamber as necessary.

As the fuel is discharged from the chamber 12 and the float 31 gradually lowered, the roller 41 will gradually move toward the point 38 of the arrow head end of the lever. The position of the parts just above described will be maintained until the roller passes the said point 38 when the lever 36 will be snapped upwardly by engagement of the roller with the lower cam edge 40 to the position illustrated in Figure 2 of the drawings.

The valve 47 is thus unseated and the ball valve 52 seated. The seating of the ball valve closes off atmospheric communication through the passages 55 and 59 and unseating of the valve 47 opens communication between the suction line and the interior of the receiving chamber 5. By thus creating a partial vacuum in the receiving chamber 5 fuel will be caused to flow into said chamber from the supply line 10 through the induction chamber 7, said fuel induction continuing until the float has been elevated to the point for causing the roller 41 to again pass the point 38 of the lever when the parts will again be quickly reset to the position illustrated in Figure 3 of the drawings.

If desired, the side walls comprising each tank 1 and 11 may be bent up from a single sheet of metal to comprise not only the enclosing walls of the tanks but also the triangular corner partitions 6 and 13, the engaging parts being soldered or otherwise secured as at 60. This manner of shaping the walls and tanks being clearly illustrated in Figure 4 of the drawings.

In the foregoing description I have disclosed a simple construction of tank in which means is provided for always maintaining a higher level of fuel in the discharging tank, the said tank portions being so arranged that the over-balancing of level in the discharging chamber over that in the receiving chamber is effected by momentum of the car during sudden starts or high speed action, by reason of position of the said tanks when the car is passing up a steep grade.

By reference to Figure 5 it will be observed that a lug 61 is projected from the valve seat member and the flap valve 16 provided with a notch into which the said lug projects thus holding the freely movable valve against turning on the mounting screw.

By positioning the main and supplementary tanks side-by-side a tank having a vertical dimension much more shallow than tanks commonly provided is made possible. This feature makes possible the positioning of the device at a higher elevation in the automobile assuring more perfect discharge of the fuel by providing a greater gravitational pull.

It will be observed that the air passage through the valve member 47 and its stem extension 49 is always open to either atmospheric communication with the interior of the tank or communication with the suction line when the ball valve 52 is closed.

From the foregoing description taken in connection with the accompanying drawings, it is thought that the novel details of construction, manner of use and the advantages of my invention will be readily apparent to those skilled in the art to which the invention relates.

What I claim is:

1. In vacuum fuel tanks of the class described, a receiving tank, a discharging tank, a back-check-valve controlled duct for passing fuel from the former of said tanks to the latter, suction operated means for supplying fuel to the receiving tank when needed, a fuel delivery duct formed vertically in one corner of the receiving tank terminating short of the tank top to communicate with the interior thereof at its upper end and connected with a source of fuel supply at its lower end, an air duct formed vertically in one corner of the discharging tank terminating short of the tank top at its upper end to communicate with the interior thereof and communicating to atmosphere at its lower end, and means for delivering fuel from the discharging tank.

2. In vacuum fuel tanks of the class described, a receiving tank, a discharging tank, a back-check-valve controlled duct for passing fuel from the former of said tanks to the latter, suction operated means for supplying fuel to the receiving tank when needed, a fuel delivery duct formed vertically in one corner of the receiving tank terminating short of the tank top to communicate with the interior thereof at its upper end and connected with a source of fuel supply at its lower end, an air duct formed vertically in one corner of the discharging tank terminating short of the tank at its upper end to communicate with the interior thereof and communicating to atmosphere at its lower end, means for delivering fuel from the discharging tank, said receiving and discharging tanks being positioned side-by-side on approximately the same level with the discharging tank to the rear of the receiving tank for the purposes specified.

3. In vacuum tanks of the class described, a receiving tank, a discharging tank, a back-check-valve controlled duct communicating between the tanks at their lower ends for passing fuel from the former of said tanks to the latter, said tanks being placed side-by-side at approximately the same level, said receiving tank having an inclined bottom directed downwardly to said duct, suction operated means for supplying fuel to the receiving tank at intervals, and means for delivering fuel from the discharging tank.

4. In vacuum tanks of the class described, a receiving tank, a discharging tank, a back-check-valve controlled duct leading from the receiving tank into the discharging tank, a suction duct, a valve for controlling communication between said suction duct and the interior of the receiving tank, a float in said receiving tank, and connections between said float and said valve for closing and opening said valve accordingly as said float rises and falls, an air duct including a ball valve seat, a ball valve cooperative with said ball valve seat, said first mentioned valve having a vertical extension to engage said ball valve when moved in one direction to unseat same and open atmospheric communication, and when moved in the opposite direction to permit the ball valve to seat to close atmospheric communication.

5. In vacuum fuel tanks of the class described, a receiving tank, a discharging tank, a back-check-valve controlled duct leading from the receiving tank into the discharging tank, a suction duct, a valve for controlling communication between said suction duct, and the interior of the receiving tank, a float in said receiving tank, and connections between said float and said valve for closing and opening said valve accordingly as said float rises and falls, an air duct including a ball valve seat, a ball valve cooperative with said ball valve seat, said first mentioned valve having a vertical extension to engage said ball valve when moved in one direction to unseat same and open atmospheric communication, said first mentioned valve having a passageway therethrough and through its extension and communicating with the air duct and said suction duct.

6. In vacuum fuel tanks of the class described, a receiving tank, a discharging tank, a back-check-valve controlled duct for passing fuel from the former of said tanks to the latter, suction operated means for supplying fuel to the receiving tanks at intervals, said suction operated means comprising a chamber communicating with atmosphere, a duct between said chamber and the interior of said receiving tank, said duct including a valve seat, a float controlled valve on said seat and having a portion projected into said chamber, said portion being of lesser cross-sectional area than said duct, means continually acting to produce a suction in said duct from said chamber, said valve and its projection having an air passage therethrough.

7. In vacuum fuel tanks of the class described, a receiving tank, a discharging tank, a back-check-valve controlled duct for passing fuel from the former of said tanks to the latter, suction operated means for supplying fuel to the receiving tank at intervals, said suction operated means comprising a chamber communicating with atmosphere, a duct between said chamber and the interior of said receiving tank, said duct including a valve seat, a float controlled valve on said seat and having a portion projected into said chamber, said portion being of lesser cross-sectional area than said duct, means continually acting to produce a suction in said duct from said chamber, said valve and its projection having an air passage therethrough, and a check valve in said chamber adapted to be unseated by said projection when said first named valve is seated and adapted to close off communication between said chamber and said duct when said first named valve is unseated for the purposes described.

8. A receiving tank and a discharging tank with a duct between them, said duct having a valve seat, a back-check-valve device in the discharging tank cooperating with said duct, said valve device comprising a carrying screw, a flap valve loosely carried on said screw, a fixed lug, said valve having a notch to receive said lug for holding the valve against turning on said screw, said screw having means for restraining said valve from leaving the vicinity of its seat, said discharging tank having a covered hole opposite the valve device through which access may be had to said valve.

WILLIAM E. HART.